United States Patent [19]

Sakamoto et al.

[11] Patent Number: 5,070,120

[45] Date of Patent: Dec. 3, 1991

[54] AQUEOUS DISPERSION OF CATIONIC CROSSLINKED RESIN PARTICLES FROM RESIN HAVING AT LEAST TWO VINYL GROUPS

[75] Inventors: Hiroyuki Sakamoto, Nishinomiya; Kenshiro Tobinaga, Kawanishi; Yasuyuki Tsuchiya, Hirakata, all of Japan

[73] Assignee: Nippon Paint Co., Ltd., Osaka, Japan

[21] Appl. No.: 376,601

[22] Filed: Jul. 7, 1989

[30] Foreign Application Priority Data

Jul. 8, 1988 [JP] Japan .............................. 63-171634
Mar. 28, 1989 [JP] Japan .............................. 1-75588

[51] Int. Cl.$^5$ .............................................. C08K 3/20
[52] U.S. Cl. .................................. 523/412; 523/201; 523/406; 523/409; 523/411; 523/423; 525/902
[58] Field of Search ............... 523/201, 411, 423, 409, 523/406, 412; 525/902

[56] References Cited

U.S. PATENT DOCUMENTS 4,323,490 4/1982 Töpfl .................................. 523/409
4,598,108 7/1986 Hoefs .................................. 427/386

Primary Examiner—Harold D. Anderson
Assistant Examiner—T. Mosley
Attorney, Agent, or Firm—Wenderoth, Lind & Ponack

[57] ABSTRACT

The present invention provides a micro gel particle having a cationic charge, prepared by a radical polymerization. The micro gel particle is obtained in the form of an aqueous dispersion. The micro gel particle dispersion is prepared by dispersing or emulsifying in an aqueous medium (A) a cationic aqueous resin and (B) a resin having at least two polymerizable vinyl groups and a number average molecular weight of 400 to 20,000, followed by radical-polymerizing.

11 Claims, No Drawings

AQUEOUS DISPERSION OF CATIONIC CROSSLINKED RESIN PARTICLES FROM RESIN HAVING AT LEAST TWO VINYL GROUPS

FIELD OF THE INVENTION

The present invention relates to an aqueous dispersion of cationic crosslinked resin particles, a process for preparing the same and a cationic electrocoating composition therefrom.

BACKGROUND OF THE INVENTION

It has been known to obtain a coated article having matted surface by electrocoating with electrodepositable paint containing internally crosslinked micro resin particles (hereinafter referred to as "micro gel particles") prepared by polymerizing an ethylenically unsaturated monomer (see Japanese Patent Publication (unexamined) Nos. 93762/1983 and 49766/1981). The micro gel particles are advantageous not only in providing matted surface, but also in coating properties and throwing power.

The micro gel particles, however, should be mixed with a resin which is water-soluble or water-dispersible and which has charges necessary for electrodeposition if it is applied for electrocoating, because they do not have suitable charges and are insoluble in an aqueous medium. On the other hand, the micro gel particles deteriorate storage stability and workability of electrocoating and it therefore is difficult to formulate in a large amount into a paint.

In order to improve the above defects, the present inventors propose in U.S. Pat. No. 4,788,246 that cationic micro gel particles are prepared by crosslinking a cationic resin and a crosslinking agent. In this patent, there is no description with respect to particles prepared by a radical addition reaction.

SUMMARY OF THE INVENTION

The present invention is to provide a micro gel particle having a cationic charge, prepared by a radical addition polymerization. The micro gel particle is obtained in the form of an aqueous dispersion. The micro gel particle dispersion is prepared by dispersing or emulsifying in an aqueous medium (A) a cationic aqueous resin and (B) a resin having at least two polymerizable vinyl groups and a number average molecular weight of 400 to 20,000, followed by radical-polymerizing.

The micro gel particle thus obtained has a crosslinked portion inside of the particle and is covered with the aqueous resin over said crosslinked portion, whereby it seems that the micro gel particle has a shell-core construction wherein the core is the crosslinked portion and the shell is the aqueous resin. The micro gel particle is electrodepositable due to cationic charge.

The present invention additionally provides a cationic coating composition containing the above micro gel particles.

DETAILED DESCRIPTION OF THE INVENTION

The cationic aqueous resin (A) is generally employed as a film-forming resin in the formulation of a cationic electrocoating composition. The resin (A) has cationic functional groups which give positive charges and hydrophilic nature to the resin, such as amino groups. Such resins are known to the art and all of them can be used in the present invention. Preferred aqueous resins are an epoxy resin having amino groups and a polybutadiene resin having amino groups (hereinafter referred to as "aminated polybutadiene").

The epoxy resin having amino groups may be prepared by reacting a polyglycidyl compound with a primary or secondary amine. The polyglycidyl compound herein is meant an epoxy compound which has at least two glycidyl groups in one molecule. The compound may be obtained by reacting an aromatic or aliphatic alcohol with epihalohydrin. Such polyglycidyl compounds are commercially available, for example, bisphenol type from Toto-kasei K. K. as Epototo YD-011; aliphatic type from Nagase-kasei K. K. as Denacol EX-212 and from Toto-kasei K. K. as PG-207; and phenol novolak type from Toto-kasei K. K. as Epototo YDPN-638. Examples of the primary or secondary amines to be added to the polyglycidyl compounds are primary amines, such as monomethylamine, monoethylamine, n-butylamine, monoethanolamine and the like; and secondary amines, such as dimethylamine, diethylamine, diisopropylamine, N-methylethanolamine, N-ethylethanolamine, diethanolamine and the like. The amines may be diketimine which is obtained by dehydration-reation of diethylenetriamine and methyl isobutyl ketone. The amines generally are reacted with the polyglycidyl compounds in an equivalent amount approximately equal to an epoxy equivalent amount of the polyglycidyl compound.

The aminated polybutadiene may be prepared by oxidizing liquid polybutadiene having a molecular weight of 500 to 5,000 with an peroxide in an amount ratio sufficient to form 3 to 12% by weight of an oxirane oxygen atom, followed by reacting with a primary or secondary amine in an amount of 30 to 300 mmol per 100 g of the polybutadiene. Details of such an aminated polybutadiene are described in Japanese Patent Publication (unexamined) Nos. 90273/1985 and 90274/1985, which correspond to U.S. Pat. No. 4573,406. The polybutadiene can form an aqueous solution or aqueous dispersion by neutralizing an acid and then diluting with water.

If desired, the cationic aqueous resin (A) may further contain polymerizable vinyl groups. The vinyl groups enhance storage stability by reacting with the component (B) infra. The introduction of the vinyl groups is known. For example, an alpha, beta-unsaturated carboxylic acid represented by

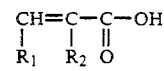

wherein $R_1$ and $R_2$ respectively represent a hydrogen atom or a methyl group, may be reacted with the above mentioned cationic aqueous resin (A).

The resin (B) has at least two polymerizable vinyl groups in one molecule and a molecular weight of 400 to 200,000, preferably 1,000 to 10,000. A principal backbone of the resin can not be limited, but preferably epoxy resin, polyester resin, alkyd resin, polyurethane resin, amino resin and the like. The polymerizable vinyl groups can be introduced into the principal backbone by known methods. For example, an epoxy group of an epoxy resin may be esterified by acrylic acid or methacrylic acid. A resin having less than two vinyl groups may be mixed with the resin (B) in a sufficient amount not to adversely affect on the reactivity.

Preferably, the resin (B) is crosslinkable at a temperature of less than 100° C. at normal pressures, because it is crosslinked in an aqueous medium. If the crosslinking reaction is carried out in an autoclave, a resin which is reactive at a temperature of more than 100° C. can be employed. The crosslinking reaction is generally conducted in the presence of a radical polymerization catalyst. Examples of the catalysts are azo catalysts, such as azobisisobutylonitrile; and peroxides, such as ketone peroxides and diacyl peroxides.

For lowering the viscosity of the resin composition of the aqueous resin (A) and the crosslinking agent (B) to emulsify with ease, the aqueous medium may further contain an organic solvent. Examples of the organic solvent are a water-miscible organic solvent, such as ethylene glycol monoethyl ether, ethylene glycol monopropyl ether, ethylene glycol monobutyl ether, methanol, ethanol, isopropyl alcohol, n-butanol, isobutanol, ethylene glycol dimethyl ether, diacetone alcohol, 4-methoxy-4-methylpentanone-2, acetone, methyl ethyl ketone, methoxy butanol, dioxane, ethylene glycol monoethyl ether acetate and the like; and a water-immiscible organic solvent, such as xylene, toluene, methyl isobutyl ketone, hexane, carbon tetrachloride, 2-ethylhexanol, isophorone, cyclohexane, benzene and the like.

Where the resin composition containing the aqueous resin (A) and the resin (B) is emulsified in an aqueous medium, at least 20 mol % of the amino group in the aqueous resin (A) is primarily neutralized with an acid and then emulsified together with the resin (B) and the aqueous medium. An amount of the resin (B) may be 5 to 250 parts by weight based on 100 parts by weight of the aqueous resin (A), calculated in terms of the solid content. Amounts of less than 5 parts by weight can provide micro gel particles. The acid for neutralizing the aqueous resin (A) includes acetic acid, propionic acid, lactic acid and the like.

The aqueous medium is primarily water. It may contain a surfactant for facilitating emulsification. Examples of the surfactants are a nonionic surfactant, such as polyethylene glycol alkylphenyl ether, polyethylene glycol alkyl ether, polyoxyalkylene alkyl ether, polyethylene glycol sorbitane monostearate, polypropylene glycol polyethylene glycol ether and the like; and a cationic surfactant, such as lauryltrimethylammonium chloride, distearyldimethylammonium chloride, alkylpicolinium chloride and the like.

It is preferred that the organic solvent in the emulsion may be azeotropically removed from the emulsion before or during heating thereafter. Removal of the solvent may facilitate crosslinking reaction.

The emulsion thus obtained is heated to above a crosslinkable temperature at atmospheric pressure or under pressure in accordance with the sort of the resin (B) to obtain an aqueous dispersion of the cationic micro gel particle of the present invention.

The micro gel particles have electric charges on the surface and stably dispersed in water due to its repulsion force. The obtained emulsion has stable to heat and therefore can proceed the crosslinking reaction of the resin (B). The crosslinking reaction can be identified by adding a solvent capable of dissolving an uncrosslinked resin, such as tetrahydrofuran. When crosslinking reaction dose not occur, the emulsion turns to transparent, and if crosslinking reaction is conducted, the solution turns to turbid white. The obtained aqueous dispersion of the cationic micro gel particle can be used in neat or the micro gel particle which is taken out from the dispersion by vacuum drying can also be used.

The aqueous dispersion of the cationic micro gel particle can be used as an aqueous coating composition, especially a cationic electrocoating composition. The aqueous coating composition may further contain a water soluble or water dispersible cationic film-forming resin if desired. Examples of the film-forming resins are an amine-modified epoxy resin, an amine-modified polybutadiene, polyether, polyester, polyurethane, polyamide, phenol resin, acrylic resin and the like. The paint is classified by curing mechanism. The first is self-curing type by radical polymerization or oxidation polymerization, the second is curing agent type using such curing agent as melamine resin and blocked polyisocyanate and the third is combination type of the first and the second. The aqueous paint may further contain a water-insoluble resin, such as epoxyacrylate resin, to improve film properties. The coating composition may separately contain a pigment. Examples of the pigments are a color pigment, such as titanium dioxide, iron oxide red, carbon black and the like; an extender pigment, such as aluminum silicate, precipitated barium sulfate and the like; and a corrosion-preventive pigment, such as aluminum phosphomolybdate, strontium chromate, basic lead silicate, lead chromate and the like. The electrocoating composition preferably adjusts the solid content to 10 to 20% by weight. The electrocoating composition is generally electrodeposited to form a film having a dried thickness of 15 to 30 micron and baked to cure.

EXAMPLES

The present invention is illustrated by the following examples, which are not to be construed as limiting the invention to their details. In the examples, part and % are based on weight, unless otherwise indicated.

PRODUCTION EXAMPLE 1

Aminated Polybutadiene A

An epoxidized polybutadiene having an oxirane oxygen atom of 6.4% was prepared by epoxidizing polybutadiene having a number average molecular weight of 2,000 and 1,2-bond of 65% (available from Nippon Petrochemicals Co. Ltd. as Nisseki Polybutadiene B-2000) with peracetate.

Next, 1,000 g of the epoxidized polybutadiene and 354 g of ethylene glycol monoethyl ether were charged in a 2 liter autoclave and 62.1 g of dimethylamine was added to react at 150° C. for 5 hours. Unreacted dimethylamine was removed by distillation to obtain an aminated polybutadiene. The aminated polybutadiene had an amine value of 120 mmol/100 g (solid content) and a nonvolatile content of 75%.

PRODUCTION EXAMPLE 2

Epoxyacrylate Resin B

One thousand parts of a bisphenol type epoxy resin having an epoxy equivalent of 950 (available from Yuka Shell Epoxy Co., Ltd. as Epicoat 1,004) was dissolved in 343 parts of ethyleneglycol monoethyl ether, to which 76.3 parts of acrylic acid, 10 parts of hydroquinone and 5 parts of N,N-dimethylamino ethanol were added and reacted at 100° C. for 5 hours to obtain a resin solution. The resin had an acid value of 2 mmol/100 g and a solid content of 75%.

EXAMPLE 1

Eighty parts of the aminated polybutadiene A of Production Example 1 was mixed with 53.3 parts by weight of the epoxy acrylate resin of Production Example 2, and then mixed with 2.0 parts of glacial acetic acid. Next, 3.0 parts by weight of azobisisobutylonitrile was added and mixed. Deionized water was added thereto and emulsified to form a resin emulsion A. The resin emulsion was transparently dissolved in tetrahydrofurane.

The emulsion was kept at 55° C. for 7 days and cooled to form a cationic resin particle dispersion. This dispersion was not dissolved in tetrahydrofurane to form a white semiopaque solution.

A tin plate was dipped in the dispersion having a solid content of 10% and taken out. The plate was dried in the air and dried at room temperature and a reduced pressure. It was then observed by a microscope to find resin particles having less than 100 nm on the surface.

A degreased steel panel was cationically electrocoated in the above obtained cationic dispersion. The coated article was baked at 170° C. for 20 minutes to form a clear coating of 20 micron. A 60° gloss was evaluated and the result is shown in Table 1.

EXAMPLE 2

Eighty parts of the aminated polybutadiene A of Production Example 1 was mixed with 40 parts of isocyanuric acid triacrylate (available from Toagosei Chemical Industry Co., Ltd. as Aeronix M-315) at 55° C., to which 2.0 parts of glacial acetic acid was added and mixed. Then, 3.0 parts of azobisisobutylonitrile was mixed and deionized water was added to form a resin emulsion B. The resin emulsion was transparently dissolved in tetrahydrofurane.

The emulsion was kept at 40° C. for 7 days and cooled to form a cationic resin particle dispersion. This dispersion was not dissolved in tetrahydrofurane to form a white semiopaque solution.

A degreased steel panel was cationically electrocoated in the above obtained cationic dispersion. The coated article was baked at 170° C. for 20 minutes to form a clear coating of 20 micron. A 60° gloss was evaluated and the result is shown in Table 1.

PRODUCTION EXAMPLE 3

Aminated Polybutadiene C

An epoxidized polybutadiene having an oxirane oxygen atom of 6.4% was prepared by epoxidizing polybutadiene having a number average molecular weight of 2,000 and 1,2-bond of 65% (available from Nippon Petrochemicals Co. Ltd. as Nisseki Polybutadiene B-2000) with peracetate.

Next, 1,000 g of the epoxidized polybutadiene and 354 g of ethylene glycol monoethyl ether were charged in a 2 liter autoclave and 62.1 g of dimethylamine was added to react at 150° C. for 5 hours. After removing unreacted dimethylamine by distillation, the resultant product was cooled to 120° C. and a mixture containing 79.3 g of acrylic acid, 7.6 g of hydroquinone and 26.4 g of ethylene glycol monoethyl ether was added to be allow to react at 120° C. for 3¾ hours. The aminated polybutadiene had an amine value of 85.2 mmol/100 g (solid content), an acid value of 10.0 mmol/100 g and a solid content of 75.4%.

Example 3

A cationic crosslinked resin particle dispersion was prepared as generally described in Example 2, with the exception that the aminated polybutadiene C of Production Example 3 was employed instead of that of Production Example 1. The resin dispersion was transparently dissolved in tetrahydrofurane.

The emulsion was kept at 40° C. for 5 days and cooled to form a cationic resin particle dispersion. This dispersion was not dissolved in tetrahydrofurane to form a white semiopaque solution.

PRODUCTION EXAMPLE 4

Firstly, 1,900 parts of a bisphenol type epoxy resin having an epoxy equivalent of 950 (available from Yuka Shell Epoxy Company as Epicoat 1,004) was dissolved in 685.3 parts of xylene, to which 112.7 parts of n-methylethanolamine was added and reacted at 130° C. for 3 hours.

To the resultant solution, 2.1 parts of hydroquinone and 0.6 parts of quinone were added. After the completion of mixing, 43.1 parts of methacrylic acid was added and reacted at 110° C. for 3 hours, to which 216 parts of methyl isobutyl ketone was added to from an amino-epoxy resin C. The resin had an amine value of 73 mmol/100 g (solid) and a solid content of 70%.

EXAMPLE 4

Eighty parts of the aminated polybutadiene C of Production Example 3 was mixed with 40.0 parts by weight of nitrile-modified polybutadiene, and then mixed with 2.0 parts of glacial acetic acid. Next, 3.0 parts by weight of azobisisobutylonitrile was added and mixed. Deionized water was added thereto and emulsified to form a resin emulsion A. The resin emulsion was transparently dissolved in tetrahydrofurane.

The emulsion was kept at 55° C. for 3 days and cooled to form a cationic resin particle dispersion. This dispersion was not dissolved in tetrahydrofurane to form a white semiopaque solution.

A degreased steel panel was cationically electrocoated in the above obtained cationic dispersion. The coated article was baked at 170° C. for 20 minutes to form a clear coating of 20 micron. A 60° gloss was evaluated and the result is shown in Table 1.

EXAMPLE 5

143 parts of the aminated polybutadiene D of Production Example 4 was mixed with 80 parts of isocyanuric acid triacrylate (available from Toagosei Chemical Industry Co., Ltd. as Aeronix M-315) at 55° C., to which 2.0 parts of glacial acetic acid was added and mixed. Then, 3.0 parts of azobisisobutylonitrile was mixed and deionized water was added to form a resin emulsion. The resin emulsion was transparently dissolved in tetrahydrofurane.

The emulsion was kept at 55° C. for 3 days and cooled to form a cationic resin particle dispersion. This dispersion was not dissolved in tetrahydrofurane to form a white semiopaque solution.

A degreased steel panel was cationically electrocoated in the above obtained cationic dispersion. The coated article was baked at 170° C. for 20 minutes to form a clear coating of 20 micron. A 60° gloss was evaluated and the result is shown in Table 1.

COMPARATIVE EXAMPLE 1

Example 1 was repeated with the exception that azobisisobutylonitrile was not employed. The obtained dispersion was dissolved in tetrahydrofurane even after keeping at 55° C. for 7 days.

COMPARATIVE EXAMPLE 2

Example 2 was repeated with the exception that azobisisobutylonitrile was not employed. The obtained dispersion was dissolved in tetrahydrofurane even after keeping at 55° C. for 7 days.

COMPARATIVE EXAMPLE 3

Example 3 was repeated with the exception that azobisisobutylonitrile was not employed. The obtained dispersion was dissolved in tetrahydrofurane even after keeping at 40° C. for 7 days.

PRODUCTION EXAMPLE 5

Firstly, 1,900 parts of a bisphenol type epoxy resin having an epoxy equivalent of 950 (available from Yuka Shell Epoxy Company as Epicoat 1,004) was dissolved in 685.3 parts of xylene, to which 112.7 parts of n-methylethanolamine was added and reacted at 130° C. for 3 hours. To the resultant solution, 225.6 parts of methyl isobutyl ketone was added to from an amino-epoxy resin E. The resin had an amine value of 146 mmol/100 g (solid) and a solid content of 70%.

PRODUCTION EXAMPLE 6

Firstly, 3760 parts of a bisphenol type epoxy resin having an epoxy equivalent of 188 (available from Toto Kasei Company as Epototo 128R) was dissolved in 154.4 parts of ethyleneglycol monoethyl ether, to which 10 parts of hydroquinone and 5 parts of N,N-dimethylamino ethanol was added and heated at 90° C. To the resultant solution, 72.1 parts of acrylic acid was added. After the completion of the addition, it was heated to 100° C. for 3 hours to obtain an epoxy acrylate resin F. The resin had an acid value of 7 mmol/100 g (solid) and a solid content of 70%.

EXAMPLE 6

One hundred and forty three parts of the aminated polybutadiene D of Production Example 4 was mixed with 107 parts by weight of the epoxy acrylate resin B of Production Example 2 at 55° C., and then mixed with 3.0 parts of glacial acetic acid. Next, 2.0 parts by weight of azobisisobutylonitrile was added and mixed. Deionized water was added thereto and emulsified to form a resin emulsion. The resin emulsion was transparently dissolved in tetrahydrofurane.

The emulsion was kept at 55° C. for 3 days and cooled to form a cationic resin particle dispersion. This dispersion was not dissolved in tetrahydrofurane to form a white semiopaque solution.

A degreased steel panel was cationically electrocoated in the above obtained cationic dispersion. The coated article was baked at 170° C. for 20 minutes to form a clear coating of 20 micron. A 60° gloss was evaluated and the result is shown in Table 1.

EXAMPLE 7

One hundred and forty three parts of the aminated polybutadiene E of Production Example 5 was mixed with 107 parts by weight of the epoxy acrylate resin B of Production Example 2 at 55° C., and then mixed with 3.0 parts of glacial acetic acid. Next, 2.0 parts by weight of azobisisobutylonitrile was added and mixed. Deionized water was added thereto and emulsified to form a resin emulsion. The resin emulsion was transparently dissolved in tetrahydrofurane.

The emulsion was kept at 55° C. for 3 days and cooled to form a cationic resin particle dispersion. This dispersion was not dissolved in tetrahydrofurane to form a white semiopaque solution.

A degreased steel panel was cationically electrocoated in the above obtained cationic dispersion. The coated article was baked at 170° C. for 20 minutes to form a clear coating of 20 micron. A 60° gloss was evaluated and the result is shown in Table 1.

EXAMPLE 8

Eighty parts of the aminated polybutadiene C of Production Example 3 was mixed with 53.3 parts by weight of the epoxy acrylate resin of Production Example 2, and then mixed with 2.0 parts of glacial acetic acid. Next, 3.0 parts by weight of azobisisobutylonitrile was added and mixed. Deionized water was added thereto and emulsified to form a resin emulsion A. The resin emulsion was transparently dissolved in tetrahydrofurane.

The emulsion was kept at 55° C. for 3 days and cooled to form a cationic resin particle dispersion. This dispersion was not dissolved in tetrahydrofurane to form a white semiopaque solution.

A degreased steel panel was cationically electrocoated in the above obtained cationic dispersion. The coated article was baked at 170° C. for 20 minutes to form a clear coating of 20 micron. A 60° gloss was evaluated and the result is shown in Table 1.

EXAMPLE 9

Eighty parts of the aminated polybutadiene C of Production Example 3 was mixed with 53.3 parts by weight of the epoxy acrylate resin F of Production Example 6, and then mixed with 2.0 parts of glacial acetic acid. Next, 3.0 parts by weight of azobisisobutylonitrile was added and mixed. Deionized water was added thereto and emulsified to form a resin emulsion A. The resin emulsion was transparently dissolved in tetrahydrofurane.

The emulsion was kept at 55° C. for 3 days and cooled to form a cationic resin particle dispersion. This dispersion was not dissolved in tetrahydrofurane to form a white semiopaque solution.

A degreased steel panel was cationically electrocoated in the above obtained cationic dispersion. The coated article was baked at 170° C. for 20 minutes to form a clear coating of 20 micron. A 60° gloss was evaluated and the result is shown in Table 1.

COMPARATIVE EXAMPLE 4

Example 6 was repeated with the exception that azobisisobutylonitrile was not employed. The obtained dispersion was dissolved in tetrahydrofurane even after keeping at 55° C. for 7 days.

TABLE 1

| Examples | 60° Gloss[1] |
|---|---|
| 1 | 16 |
| 2 | 13 |
| 3 | 11 |
| 4 | 14 |
| 5 | 13 |
| 6 | 18 |

TABLE 1-continued

| Examples | 60° Gloss[1] |
|---|---|
| 7 | 15 |
| 8 | 13 |
| 9 | 11 |
| Comparative Example | |
| 1 | 50 |
| 2 | 42 |
| 3 | 52 |
| 4 | 48 |

[1]Gloss was measured at an incidence angle of 60°.

What is claimed is:

1. An aqueous dispersion of cationic crosslinked resin particles prepared by dispersing or emulsifying in an aqueous medium (A) a cationic aqueous resin and (B) a resin having at least two polymerizable vinyl groups and a number average molecular weight of 400 to 20,000, followed by radical-polymerizing.

2. The aqueous dispersion according to claim 1 wherein said cationic aqueous resin (A) is an epoxy resin having amino groups or a polybutadiene resin having amino groups.

3. The aqueous dispersion according to claim 1 wherein said cationic aqueous resin (A) further contain polymerizable vinyl groups.

4. The aqueous dispersion according to claim 1 wherein said resin (B) is crosslinkable at a temperature of less than 100° C. at normal pressures.

5. The aqueous dispersion according to claim 1 wherein said crosslinking reaction is conducted in the presence of a radical polymerization catalyst.

6. A process for preparing an aqueous dispersion of cationic crosslinked resin particles, comprising dispersing or emulsifying in an aqueous medium (A) a cationic aqueous resin and (B) a resin having at least two polymerizable vinyl groups and a number average molecular weight of 400 to 20,000, followed by radical-polymerizing.

7. The process according to claim 6 wherein said cationic aqueous resin (A) is an epoxy resin having amino groups or a polybutadiene resin having amino groups.

8. The process according to claim 6 wherein said cationic aqueous resin (A) further contain polymerizable vinyl groups.

9. The process according to claim 6 wherein said resin (B) is crosslinkable at a temperature of less than 100° C. at normal pressures.

10. The process according to claim 6 wherein said crosslinking reaction is conducted in the presence of a radical polymerization catalyst.

11. An aqueous coating composition containing the aqueous dispersion of cationic crosslinked resin particles according to anyone of claims 1 to 5.

* * * * *